United States Patent [19]

Comins et al.

[11] Patent Number: 5,179,641
[45] Date of Patent: Jan. 12, 1993

[54] RENDERING SHADED AREAS WITH BOUNDARY-LOCALIZED PSEUDO-RANDOM NOISE

[75] Inventors: Todd Comins, N. Chelmsford; Willem Engelse, Townsend, both of Mass.

[73] Assignee: Digital Equipment Corporation, Maynard, Mass.

[21] Appl. No.: 370,732

[22] Filed: Jun. 23, 1989

[51] Int. Cl.$^5$ .............................................. G06F 15/20
[52] U.S. Cl. ..................... 395/132; 395/143
[58] Field of Search ............. 364/518, 521; 340/721, 340/723, 725, 726, 729; 395/142, 143, 132, 126

[56] References Cited

U.S. PATENT DOCUMENTS

| | | | |
|---|---|---|---|
| 3,739,082 | 6/1973 | Lippel | 178/6 |
| 4,447,803 | 5/1984 | Crosby et al. | 340/347 CC |
| 4,460,924 | 7/1984 | Lippel | 358/310 |
| 4,543,599 | 9/1985 | Willis et al. | 358/13 |
| 4,566,028 | 1/1986 | Lewis, Jr. et al. | 358/21 R |
| 4,594,726 | 6/1986 | Willis | 375/26 |
| 4,652,905 | 3/1987 | Lippel | 358/13 |
| 4,730,185 | 3/1988 | Springer et al. | 340/701 |
| 4,987,484 | 1/1991 | Ikeda et al. | 358/456 |
| 5,031,050 | 7/1991 | Chan | 358/298 |

OTHER PUBLICATIONS

Lawrence Gilman Roberts, "Picture Coding Using Pseudo-Random Noise", IRE Transactions on Information Theory, Feb. 1962, pp. 145–154.
Heckbert, P., "Color Image Quantization for Frame Buffer Display", Computer Graphics, vol. 16, No. 3, Jul. 1982, pp. 297–307.
Goodall, W. M., "Television by Pulse Code Modulation", Bell System Technical Journal, Jan. 1951, pp. 33–49.

Primary Examiner—Heather R. Herndon
Attorney, Agent, or Firm—Cesari and McKenna

[57] ABSTRACT

A computer graphics technique for rendering shaded areas by using pseudo-random noise localized to image boundaries is disclosed. Calculated pixel values are initially generated using an arithmetic accuracy larger than the word size of an associated bitmap memory. The calculated pixel values thus have a most significant portion, corresponding to the portion which is to be stored in bitmap memory, and a least significant portion, corresponding to the additional accuracy. Pseudo-random noise, preferably generated by a linear feedback shift register, is then added to some or all of the least significant portion, and the carry output from this operation is added to the most significant portion. The most significant portion is then written into bitmap memory. Changes in the value of the integer portion thus occur with increased frequency as the distance to an intensity boundary decreases, since the random noise causes the dithering to occur with increased frequency. The result is a more natural display than would otherwise be available with a given bitmap memory word size.

16 Claims, 2 Drawing Sheets

RENDERING SHADED AREAS WITH BOUNDARY-LOCALIZED PSEUDO-RANDOM NOISE

CROSS REFERENCE TO RELATED APPLICATION

This application is related to other applications subject to assignment to Digital Equipment Corporation, as follows:

"Method of Calculating Intensities of Individual Pixels in Smooth Shaded Trapezoids," DEC File No. PD89-0162;

"Image Processing Using Fixed Print Line Interpolators," DEC File No. PD89-0163; and "Linear Address Conversion for 2D Imager," DEC File No. PD89-0164.

FIELD OF THE INVENTION

This invention relates to computer graphics, and more particularly to a technique for rendering shaded areas.

BACKGROUND OF THE INVENTION

Graphic workstations are devices that display computer-generated images on a display, typically a raster scan cathode ray tube (CRT). Images may originate from various sources, such as a mathematical model or a document scanner. Regardless of their origin, however, images are ultimately represented as an array of data values. Each data value specifies the intensity of a corresponding elemental physical area of the face of the CRT, called a pixel. If the CRT is a color CRT, each data value specifies the color of a pixel.

To cause the image to appear on the CRT, the pixel data values are first written into a dedicated high-speed bitmap memory associated with the workstation. The bitmap memory (also called a frame buffer) is arranged as a two-dimensional array, with each bitmap memory location corresponding to a physical pixel location. The pixel values are repetitively and sequentially read from the bitmap memory, in synchronism with the CRT's horizontal and vertical refresh timing. In color workstations, three digital-to-analog converters (DACs) are then used to generate three analog signals from the sequence of pixel values, with one analog signal for each of the red, green, and blue color intensity inputs of the CRT.

Creating an image as a sequence of pixel values can be quite calculation-intensive. Most workstations thus usually include a graphics subsystem which operates on high-level graphic object descriptions, or primitives, to produce the series of pixel values, as well as corresponding bitmap addresses into which the pixel values should be written. Common graphics operations such as translation and scaling, as well as more complicated functions such as three-dimensional to two-dimensional conversion, anti-aliasing, and shading are thus performed by the graphics subsystem. This frees the applications programmer from the drudgery of specifying the value and location of each pixel.

For example, an application program running on a host processor associated with the workstation may generate a graphic primitive that instructs the subsystem to draw a shaded trapezoid. The primitive includes a list of the locations of the trapezoid's vertices, a particular starting color, and x-coordinate and y-coordinate color increments. The subsystem then executes this primitive to cause the correct pixel values to be written into the correct locations of bitmap memory, using the start color and color increments.

The subsystem calculates each pixel value as a fixed-point number having an integer part and a fractional part. The integer part is typically limited to the number of bits in the bitmap memory word size. The pixel values are first computed with high resolution, and then rounded up or down to the nearest integer value, before being written into bitmap memory. This rounding technique provides transitions between colors in the correct places in the image.

The quality of the resulting image depends quite noticeably upon the number of bits used to specify each pixel value. In other words, the greater the number of bits in each word of the bitmap memory, the larger the range of available colors and intensities. It is generally agreed that a word size of twenty-four bits, with eight bits allocated to each of the three color channels, is needed to approach the image quality of a standard color television.

Despite the ever-decreasing price of semiconductors, however, bitmap memory is still relatively expensive, so that a workstation having a twenty-four bit bitmap memory can be quite costly. In addition, most applications do not require the use of all $2^{24}$ possible colors simultaneously, and a much smaller subset, say 16 colors, is sufficient. Accordingly, the applications programmer can specify which 16 colors are needed. The 16 twenty-four bit color values are not directly fed to the DACs, but rather, are stored in another memory, called a color look-up table (LUT). Each pixel value is then used as an address input to the LUT. The data output from the LUT is then used to control the DACs. This allows each pixel data word in the bitmap memory to be only four bits wide ($2^4=16$), and yet the 16 colors can be selected from the entire range of $2^{24}$ possible colors.

However, there is a disadvantage to the foregoing arrangement, as only sixteen of the $2^{24}$ colors can be displayed simultaneously. This compromise can be accepted in many applications, such as in presentation of two-dimensional images. However, the realism of a three-dimensional image depends heavily upon how well it is shaded. Sixteen shades of a given color do not afford the necessary gradual change from dark to light to provide a sufficiently realistic image of a round object as it is viewed in normal sunlight. This is because there will be a visible line where the intensity levels change, resulting in readily observable steps in the shaded image. It is generally believed that a four-bit wide bitmap memory results in poor shading of three-dimensional objects, since realism is achieved by gradual change over many shades and not by discrete steps between a few shades.

It is known that when displaying shaded images on a graphic display, the different color intensities can be blended, or "dithered," to prevent the human eye from observing intensity changes as discrete steps. Thus, random transitions can be generated in the pixel data word's least significant bits by adding random numbers to the output of the LUTs. This approach can create the illusion of having a greater range of colors, especially when a display such as a CRT is viewed at a distance of many feet. However, in other applications, such as computer workstations, where the CRT is most often viewed at a distance of one to three feet, the human eye may perceive a "flickering" effect as the pixel values change at the CRT scan rate.

Another technique called "ordered dithering" can be used to blend the intensity steps. This technique adds a predetermined random number to the fixed-point calculated pixel values before they are rounded to the nearest integer. The predetermined random number is determined by using the bitmap address bits of each pixel value as an index into a fixed array of predetermined fractional numbers. The fractional number addressed thereby is then added to or subtracted from the corresponding pixel value. The result is rounded and stored in the bitmap memory.

This process results in a dithering effect, because some pixel values will be changed enough to cross the intensity threshold into the next highest intensity. While the ordered dither technique provides visual blending along the boundary between intensity regions, a careful human eye can discern the resulting predetermined patterns on the CRT.

What is needed is a way to improve image quality by smoothing the discrete edges which are often visible along the boundary between intensity regions, especially in shaded images. The technique should improve image quality without increasing the number of colors required to be simultaneously displayed. In addition, it should be cost-effective, and avoid the need to increase the word size of the bitmap memory or the color look-up table. For the effect to be natural, the probability of dithering a particular pixel should increase as its distance to an intensity boundary decreases.

SUMMARY OF THE INVENTION

Briefly, a graphic subsystem constructed in accordance with the invention executes graphic primitives to provide a series of calculated pixel values. The calculated pixel values are ultimately used to specify the color of a pixel on the display. Each calculated pixel value is initially calculated to a higher accuracy than will eventually be needed. That is, the calculated pixel values are generated using an arithmetic accuracy larger than the word size of an associated bitmap memory. The calculated pixel values thus have a most significant portion, corresponding to the portion which is to be stored in bitmap memory, and a least significant portion, corresponding to the additional accuracy. The calculated pixel values are then operated on by a dithering logic circuit. In this logic circuit, random data values are generated by a pseudo-random noise (PN) sequence generator. The random data values are added to the calculated pixel values; sometimes, the random data values are sufficiently large to change the most significant portion of the result of this addition. The result of the addition is then used as a dithered pixel value, which is in turn truncated and written into bitmap memory.

In other words, each calculated pixel value originates as an N-bit fixed point number, having an integer part and a fractional part. The integer part has a value in the range of 0 to $2^M-1$, where M is less than N. A PN generator provides a random fractional value, R, distributed in the range $0 < R\ 1$, for each calculated pixel value. The random fractional value R is determined with N-M bit accuracy. The random fractional value R is then added to each calculated pixel value. The result of the addition is truncated to the integer part only. The truncated integer part is forwarded to be stored as a dithered pixel value in the bitmap memory.

The PN generator can be constructed from a linear feedback shift register to generate uniformly distributed random fractional values.

If there is a color look-up table associated with the bitmap memory, it can be loaded with color values in monotonic order to insure that the dithering logic has the appearance of gradually changing from one color shade to the next lighter or darker shade.

The dithering logic can be enabled or disabled, such as by applications software or by overlay plane masking, to limit its operation to certain objects or portions of the display.

With this arrangement, as a calculated pixel value nears a "rounding up" value, that is, as the fractional portion of the calculated pixel value increases, the random values will cause the dithering to occur with increasing frequency. This is because the statistical probability of incrementing a calculated pixel value is equal to the magnitude of the fractional portion. A "smeared" intensity transition, in which discrete color changes are indiscernible to the human eye at normal screen resolutions and distances, thus occurs. The result is a more natural appearing display than would otherwise be achievable with a bitmap memory of a given size.

The size of the area over which the dithering occurs can be controlled by adjusting the magnitude of the range over which the pseudo-random value varies.

The invention thus realistically renders shaded images with a minimal additional hardware investment, without increasing the number of bits per pixel value stored in bitmap memory.

Since the noise is added before the pixel values are stored in the bitmap memory, the dithered pixel values remain constant until the bitmap memory is rewritten by the application software. Thus, no flickering of pixels from scan to scan is discernible.

The invention is simpler and less expensive to implement than prior approaches that used arrays of predetermined random values, since it uses a linear shift register to generate random numbers, rather than a memory with pre-stored numbers. It avoids producing the predetermined patterns that are sometimes evident with other approaches.

BRIEF DESCRIPTION OF THE DRAWINGS

The above and further advantages of the invention may be better understood by referring to the following description in conjunction with the accompanying drawings, in which.

DETAILED DESCRIPTION OF ILLUSTRATIVE EMBODIMENTS

Figure 1:
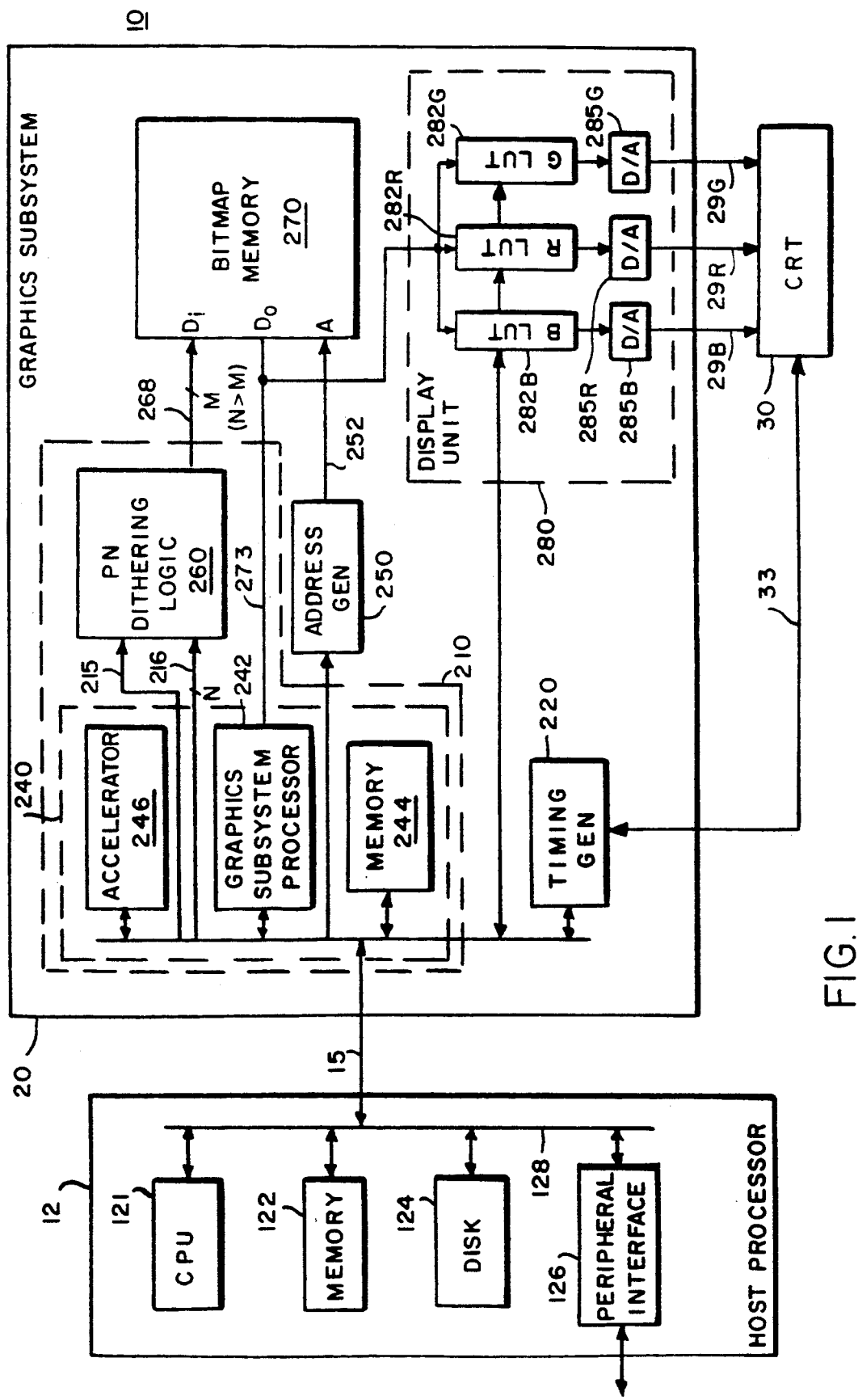
FIG. 1 is a block diagram of a graphics workstation that includes pseudo-random noise pixel value dithering logic according to the invention.

This invention is advantageously embodied in a computer system generally known as a graphics workstation. As shown in FIG. 1, a typical workstation 10 includes a host processor 12, a graphics subsystem 20 and a color cathode ray tube (CRT) display 30. The host processor 12 is a conventional digital computer, including a central processing unit (CPU) 121, a memory 122, disk storage 124, and a peripheral interface 126 interconnected by a host processor bus 128.

Applications software executed by the host processor 12 causes graphic primitives and other instructions such as data transfer, program download, and the like to be communicated to the graphics subsystem 20 over a host-to-subsystem bus 15. As a result of operating in accordance with instructions from the host processor 12, graphics subsystem 20 generates three analog signals 29B, 29R, and 29G suitable for controlling respective blue, red and green intensity inputs of the CRT 30, and thereby causes visible images to appear on the face of the CRT 30.

Generally speaking, the operations performed by the graphics subsystem 20 can be divided into two functions. The first, called graphics rendering, is the process of interpreting graphic primitives received from the host processor 12 to generate an array of calculated pixel data values representing the desired intensity of specific pixels on the CRT 30. The graphics rendering function also determines an address, corresponding to a location in a bitmap memory, into which each pixel value should be written. Accordingly, the graphics subsystem 20 includes a graphics rendering unit 210 that presents pixel values and associated addresses to a bitmap memory 270.

The second function of graphics subsystem 20 is graphics display. This function, performed by a display unit 280, is the process of sequentially reading out the contents of the bitmap memory 270 and producing the image on the viewing surface of the CRT 30.

Unlike prior workstations, a rendering unit 210 constructed in accordance with the invention includes a pseudo-random noise (PN) dithering logic unit 260 that selectively adds a realistic shading effect to boundaries between intensity regions in an image. An especially dramatic improvement in quality of shaded images is available through the use of the PN dithering logic 260, even though a relatively small word size, say, of only four bits, is available in the bitmap memory 270.

To understand how this is accomplished, consider the components of rendering unit 210 and its operation in greater detail. The rendering unit 210 includes a subsystem processor 242, a memory 244, an arithmetic accelerator 246, an address generator 250 and the PN dithering logic 260. A timing generator 220 coordinates the operation of the various components of the rendering unit 210, as well as other timing functions described below. A subsystem bus 245 provides a communication path between the various components of the rendering unit 210. The subsystem processor 242, memory 244, accelerator 246, and address generator 250 are collectively referred to as a graphics engine 240.

In operation, a graphic primitive instruction is sent from the host processor 12 to the graphics subsystem 20 over bus 15. The rendering unit 210 receives this instruction and, in accordance with the invention, provides dithered pixel data values on a line 268. Concurrently, address generator 250 generates a corresponding write address for each dithered pixel value on a line 252.

As an example of how this is accomplished, consider the operation of rendering unit 210 upon receipt of a particular graphic primitive such as an instruction to draw an intensity-interpolated trapezoid. The instruction specifies the (x,y) coordinates of the four vertices of the trapezoid, a starting color of a particular start vertex, such as the vertex closest to the upper left hand corner of the CRT 30, and a span (or x-coordinate) color-increment value and an edge (or y-coordinate) color-increment value for each of the red, green, and blue channels. Such an instruction causes the graphics subsystem 20 to render a trapezoid on the face of CRT 30, the trapezoid having a color that gradually changes from one edge to another.

The arguments specified in the instruction from host 12 are used by graphics engine 240 to control the interpolation of the color of the trapezoid through the rendering process. In other words, the trapezoid is rendered by loading the start color value into a storage location, in the memory 244 associated with the graphics subsystem processor 242, used as a color register. The contents of the color register are then output as the first calculated pixel value on line 216. The span color-increment is then added to the color register to find the next calculated pixel value. Each horizontal span of pixels is then rendered in this fashion, with the calculated pixel values output on line 216. At the end of each span, the color register is re-loaded with the start color plus the edge color-increment times the span number (i.e., the number of spans already rendered), and the next span is rendered. The accelerator 246 is typically used for this process, thereby relieving the subsystem processor 242 of the need to perform repetitive additions.

The rendering process preferably occurs with fixed point arithmetic and an arithmetic accuracy such that the number of bits, N, in the calculated pixel value on line 216 is greater than M, the word size of the bitmap memory 270. This allows the span color-increment and edge color-increment values to be fractional, which in turn results in the trapezoid being rendered as a series of adjacent color intensity regions.

The result is that each calculated pixel value on line 216 is initially calculated to a higher accuracy than will eventually be needed. The calculated pixel values are thought of as having a most significant portion, corresponding to the portion which is to be written into the bitmap memory 270, and a least significant portion, corresponding to the additional accuracy.

The N-bit wide calculated pixel value on line 216 is then fed to the dithering logic 260. Dithering logic 260 adds a random data value to each calculated pixel value. The random data values are chosen from a range of possible values indicated by the number of bits in the least significant portion of the calculated pixel value. In other words, the magnitude of the random data values are sometimes sufficiently large to change the most significant portion of the result of the addition, and other times the random data values are not large enough. The result of the addition is then truncated to M bits and used as the dithered pixel value. The dithered pixel value is then output to the bitmap memory 270 on line 268.

Graphics engine 240 may also provide one or more control signals on a line or lines 215 to PN dithering logic 260, to selectively enable the PN dithering logic 260 to operate on some pixels and not on others. When the dithering logic 260 is disabled, it simply truncates the N-bit calculated pixel value to the M-most significant bits.

Concurrent with generation of the dithered pixel data values on line 268, the address generator 250 receives the starting (x,y) coordinate and four vertices from the instruction specified by host 12, and presents the addresses corresponding to the desired location of CRT 30 at which each dithered pixel data value o line 268 is to be displayed.

To complete the rendering function, the bitmap memory 270 receives the dithered pixel values and corresponding addresses on lines 268 and 252, and stores the dithered pixel values at the memory locations indicated by the addresses.

Concurrently with the rendering function, recall that subsystem 20 also performs a display function, which is the process of reading the contents of the bitmap memory 270 and presenting them to the display unit 280, which then in turn generates the color intensity signals 29B, 29R, and 29G.

The display function is accomplished in part by the timing generator 220, which periodically and sequentially scans the bitmap memory 270 so that the pixel values are read out in the proper order and sent to display unit 280 via a bitmap memory output 273. The timing generator 220 also controls horizontal and vertical timing inputs 33 of the CRT 30, so that each pixel data value is presented at the proper time to appear in the desired (x,y) coordinate on the face of the CRT 30.

The display unit 280 performs the rest of the display function. It includes color look-up tables (LUT) 282R, 282G, and 282B, and associated digital-to-analog converters (DAC) 285R, 285G, and 285B, for the red, green and blue color channels, respectively. The display unit 280 may also include circuits which provide other functions, such as window and cursor controls, which are not shown in FIG. 1.

The pixel values provided by bitmap memory 270 on line 273 are used as address inputs for the LUTs 282R, 282G, and 282B while the display function is enabled. The output from the LUTs 282R, 282G, and 282B are then fed to the corresponding DACs 285R, 285G, and 285B, to produce the analog intensity signals 29R, 29G, and 29B. The data output from the LUTs 282 thus determines the exact color of each displayed pixel. If the entries in the LUTs 282 are arranged monotonically, an increase in a particular calculated pixel value will change the corresponding pixel on the face of the CRT 30 to the next darker or lighter shade. The contents of the LUTs 282R, 282G, and 282B, indicating the desired range of colors to be displayed, are loaded into the LUTs 282 by the graphics engine 240 via the bus 245, typically in response to a look-up table load instruction from the host 12.

Figure 2:
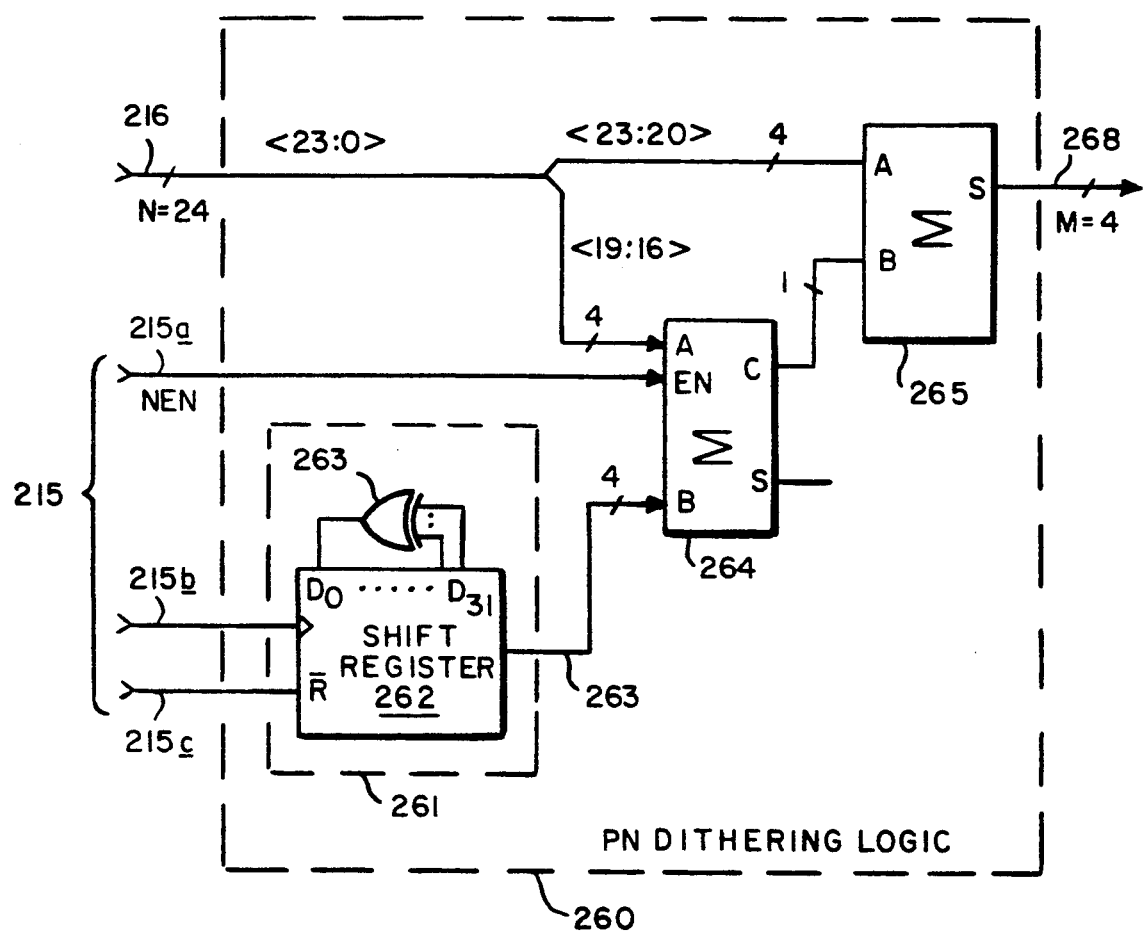
FIG. 2 is a detailed circuit diagram of one embodiment of the pseudo-random dithering logic block shown in FIG. 1.

To better understand the operation of the invention, consider the embodiment of the PN dithering logic 260 shown in FIG. 2. The most significant bits of the calculated pixel data values on line 216 (or integer portion) are fed to one input A of an adder 265. A high-order portion of the remaining, least significant bits (or fractional portion) of the calculated pixel data values are fed to an input A of a second adder 264. A pseudo-random number (PN) generator 261 presents a pseudo-random fractional number at an output line 263. The pseudo-random number is applied to another input B of the adder 264, and the single bit carry signal from the adder 264 is then applied to another input B of the adder 265. The sum output S of the adder 265 provides the dithered pixel values along the output line 268.

The carry C from the adder 264 either increments the integer portion of the calculated pixel value by one or leaves it unaffected. The greater the fractional portion of the fixed-point calculated pixel value on the line 216, the more likely a carry of the pseudo-random noise addition will result, and thus the more likely an increment in the integer portion of the dithered pixel value.

For example, assume that the pseudo-random numbers are uniformly distributed over a range from "0" to "1". If the calculated pixel value is "7.25", only random values greater than or equal to "0.75" will be sufficient to cause an increment of the integer portion to "8". Thus, there is only a 25% chance that this pixel value will be dithered. However, if the calculated pixel value is "7.9", there is a 90% chance of incrementing it to the next shade.

In the embodiment of FIG. 2, the PN dithering logic 260 is configured to generate four-bit wide dithered pixel values on the output line 268 from 24-bit wide calculated pixel values received on line 216. The most significant portion of the calculated pixel values is thus bits <23:20>(bit 23 being the most significant bit, and bit 0 the least significant). The higher-order portion of the fractional part is thus selected as bits <19:16>. Although in this example the number of bits in the high-order portion of the fractional part equals the number of bits in the most significant portion, this is not necessary to achieve correct operation of the invention.

The PN generator 261 is shown as including a linear feedback maximal length shift register 262. Linear feedback is provided by exclusive-OR-ing the output of two or more stages of the shift register 262 in an exclusive-OR gate 263. The output of exclusive-OR gate 263 is fed to the input of the first stage of the shift register 262. It is advantageous to use a fairly long shift register so that its repeat cycle is also long. The illustrated shift register is 32 bits long, and thus will repeat its pattern only once every $2^{32}$-1 or $4 \times 10^9$ clock cycles.

For further details on selection of feedback stages, and how different types of linear feedback shift registers operate, reference can be had to Dixon, R.C., *Spread Spectrum Systems*, (1976: J. Wiley & Sons, 1976), especially at pages 60-85. A detailed list of feedback stage configurations are given in Dixon at page 81.

Considering briefly both FIG. 1 and FIG. 2, the graphics engine 240 can specify whether or not the pixel data values will have random noise added to them. This is accomplished by providing the PN dithering logic 260 as a noise enable (NEN) signal on a line 215A.

Likewise, the operation of the shift register 262 can be further controlled by the graphics engine 240 if a PN dither clock signal on line 215A and PN dither clear signal on line 215C are made available. If this is done, the PN dither clock signal should be incremented at least once for every calculated pixel value, or else the same noise will be added to a number of calculated pixel values.

The operation of dithering logic 260 thus gives the appearance of enhancing the resolution of the display on the CRT 30. However, various modifications and additions can be made to the invention as described above. For example, a bit in each pixel value stored in the bitmap memory 270 can be used as an overlay plane to select where the pseudo-random noise effect will take place. Of course, this requires a signal line 273, as shown in FIG. 1, so that the subsystem processor 242 can read the contents of the bitmap memory 270.

While the foregoing embodiment of the invention has been described as operating with fixed point unsigned arithmetic, it can be carried out with different types of arithmetic, either signed or floating point, and with various combinations of word sizes or completely in software.

The illustrated PN dithering logic circuit is intended as exemplary only. The random data values can be other than uniformly distributed, can be generated with non-maximal length, pseudo-noise shift registers, or generated by using other known random number generation techniques.

Additionally, although separate color LUTs 282B, 282R, and 282G are shown in FIG. 1 for each of the color channels, the invention can be used with a system having a single, shared look-up table, a single D/A converter driven by multiple color tables, or even in a monochrome graphics system.

It is apparent that still further variations and modifications may be made to the invention, with the attainment of some or all of the advantages of the invention. Therefore, it is the object of the appended claims to cover all such variations and modifications as come within the invention's true spirit and scope.

I claim:

1. A computer graphics workstation for displaying a visual representation of an image, comprising:
   a host data processor, for providing a graphic primitive instruction representing the image to be displayed;
   means for rendering a representation of the image as an array of pixel values, wherein each pixel value represents an intensity of a corresponding pixel of the image to be displayed;
   means for dithering the pixel values such that the probability of dithering a pixel value increases as the distance between the corresponding pixel in the image and in intensity boundary in the image decreases, thereby providing dithered pixels;
   a bitmap memory connected to store the dithered pixel values;
   means for periodically scanning the bitmap memory to retrieve the dithered pixel data values, and for thereby generating intensity input signals; and
   a display, connected to receive the intensity input signals and to produce a visual representation of the image.

2. An apparatus as claim 1 additionally comprising:
   signal conversion means, disposed between the means for periodically scanning the bitmap memory and the display, for converting the dithered pixel values to an analog intensity signal.

3. An apparatus as in claim 1 wherein the means for dithering further comprises:
   means for separating each of the pixel values into a higher-order portion and a lower-order portion;
   means for generating random values;
   means for adding each corresponding random values to the lower-order portion of the corresponding pixel value to generate a carry output; and
   means for adding the carry output to the higher-order portion of each pixel value, to generate the dithered pixel values.

4. An apparatus as in claim 3 wherein the means for generating random values comprises a linear feedback shift register that generates pseudo-random values.

5. An apparatus as in claim 3 wherein each pixel value has a first portion having the same predetermined number of bits as the number of bits in a single memory location of the bitmap memory, and a second portion having a predetermined number of bits representing additional accuracy in the intensity of the pixel data value, and wherein the means for generating a random value further comprises:
   a pseudo-random value generator for generating the random values, the pseudo-random values each having fewer bit than the second portion of the calculated pixel value.

6. An apparatus as in claim 1 wherein the means for dithering further comprises:
   means for separating each pixel value into an integer part, having a value in the range of 0 to $2^M-1$, where M is the number of bits in the integer part, and a fractional part, having a value in the range between 0 and 1, the frictional part with N-M bits, where N is the total number of bits in the pixel value;
   means for generating a pseudo-random fractional value, distributed in the range between 1 and 1, for each pixel value, each pseudo-random fractional value determined with K bit accuracy, where K is less than N-M;
   means for adding at least the K most significant bits of the fractional part of each pixel value to the pseudo-random fractional value, to generate a carry output; and
   means for adding the carry output to the integer part, for each pixel value, thereby generating the dithered pixel values.

7. An apparatus for rendering a visual representation of an image, the apparatus comprising:
   means for rendering a representation of the image as an array of calculated pixel values, wherein each calculated pixel value represents an intensity of a corresponding pixel of the image;
   random data value generating means, for generating a plurality of random data values;
   adding means, connected to the means for rendering and the random data value generating means, the adding means for adding the random data values to the calculated pixel values, and for thereby generating an array of dithered pixel values;
   pixel value truncation means, connected to receive the array of dithered pixel values, for truncating the dithered pixel values, and thereby generating an array of truncated pixel values;
   a bitmap memory, having address terminals, data terminals, and a plurality of memory locations for storing data values, the data terminals connected to receive the array of truncated pixel values, and to store the truncated pixel values in the plurality of memory locations as memory data signals;
   a two-dimensional raster scan display having horizontal and vertical refresh timing cycle timing, and an intensity input terminal;
   address generator means for generating address signals, the address signals connected to the address terminals of the bitmap memory, and such that the memory data signals are sequentially and repetitively read out of the memory locations in the bitmap memory, and such that the memory data signals are read in synchronizm with the horizontal and vertical refresh cycle timing of the raster scan display; and
   signal conversion means, connected to receive the memory data signals from the bitmap memory, for converting the memory data signals into an intensity signal, and the intensity signal being connected to the intensity input terminal of the display, thereby generated the visual representation of the image.

8. An apparatus as in claim 7 wherein the signal conversion means is a digital-to-analog converter, connected to receive the truncated pixel data values from the bitmap memory, and to provide the intensity signals to the display.

9. An apparatus as in claim 7 additionally comprising:
a color look-up table memory, disposed between the bitmap memory and the signal conversion means, the color look-up table having address input terminals, and providing a look-up table index at a look-up data output terminal, the look-up table address input terminals connected to the data terminals of the bitmap memory to receive the memory data signals as address input signals, and the look-up table output terminal connected to the signal conversion means, to provide the intensity signal.

10. An apparatus as in claim 7 wherein the random data value generating means comprises a linear feedback shift register which generates pseudo-random data values.

11. An apparatus for rendering a visual representation of an image, the apparatus comprising:
a data processor, connected to provide a sequence of pixel data words at an output bus, the pixel data words each comprising M bits, the M bits of each pixel data word representing an intensity of a corresponding pixel of the image to be displayed;
a linear feedback shift register having a plurality of stages, with a predetermined number, N, of the stages being connected to a shift register output bus, to provide a sequence of pseudo-random data words each having N bits, where N is less than M;
an adder, connected to receive the M bits of the pixel data words from the processor bus, and to receive the N bits of the pseudo-random data words from the linear feedback shift register, the adder connected to add the N bits of each received pseudo-random data word to the N least significant bits of each correspondingly received pixel data word, the adder connected to provide a sequence of adder output data words;
a truncator, connected to receive the sequence of adder output data words, and connected to select the M-N most significant bits of each adder output data word, and connected to provide a series of truncated data words;
a bitmap memory, having address terminals, data terminals, and a plurality of memory locations for storing data values, the data terminals connected to receive the sequence of truncated data words, and to store the truncated data words in the plurality of memory locations as memory data signals;
a two-dimensional raster scan display having horizontal and vertical refresh timing cycle timing, and an intensity input terminal;
an address signal generator which generated sequential and repetitive address signals which are connected to the address terminals of the bitmap memory, such that the memory data signals are read in synchronism with the horizontal and vertical refresh cycle timing of the raster scan display; and
a signal converter, connected to receive the memory data signals from the bitmap memory, and connected to provide converted memory data signals as an intensity signal, which is connected to the intensity input terminal of the display.

12. A method for displaying a visual representation of an image on a computer graphics workstation, the method comprising the steps of:
using a host data processor to generate a graphic primitive instruction representing the image to be displayed;
rendering a representation of the image as an array of pixel values, wherein each pixel value represents an intensity of a corresponding pixel of the image to be displayed;
dithering the pixel values such that the probability of dithering a pixel value increases as the distance between the corresponding pixel in the image and an intensity boundary in the image decreases, thereby providing dithered pixels;
storing the dithered pixel values in a bitmap memory;
periodically scanning the bitmap memory to retrieve the dithered pixel values, thereby generating intensity input signals; and
producing a visual representation of the image by connecting the intensity input signals to a display.

13. A method as in claim 12 additionally comprising the step of, between the step of scanning the bitmap memory and the step of displaying the image, converting the dithered pixel values to an analog intensity signal.

14. A method as in claim 12 wherein the step of dithering the pixel values further comprises the steps of, for each pixel value:
separating each pixel value into a higher-order portion and a lower-order portion;
generating a random value;
adding each corresponding random value to the lower-order portion of the pixel value, to generate a carry output; and
adding the carry output the higher-order portion of the pixel value, to generate the corresponding dithered pixel value.

15. A method as in claim 14 wherein the step of generating a random value further comprises the step of:
generating a pseudo-random value, the pseudo-random value having fewer bits than the lower-order portion of the pixel value.

16. A method as in claim 12 wherein the step of dithering the pixel values further comprises the steps of:
separating each pixel value into an integer part, having a value in the range of zero to $2^M-1$, where M is the number of bits in the integer part, and a fractional part, having a value int eh range between 0 and 1, the fractional part with N-M bits, where N is the total number of bits in the pixel value;
generating a pseudo-random fractional value, distributed in the range between 0 and 1, for each calculated pixel value, the pseudo-random fractional value determined with K bit accuracy, where K is less than N-M;
adding at least the K most significant bits of the fractional part of each pixel value to the pseudo-random fractional value, to generate a carry output; and
adding the carry output to the integer part, for each pixel value, thereby generating the dithered pixels.

* * * * *